US012062091B1

(12) United States Patent
Ciabattoni

(10) Patent No.: US 12,062,091 B1
(45) Date of Patent: Aug. 13, 2024

(54) QUOTE DEPLETION PROTECTION

(71) Applicant: Cboe Exchange, Inc., Chicago, IL (US)

(72) Inventor: William Ciabattoni, New York, NY (US)

(73) Assignee: Cboe Exchange, Inc., Chicago, IL (US)

( * ) Notice: Subject to any disclaimer, the term of this patent is extended or adjusted under 35 U.S.C. 154(b) by 0 days.

(21) Appl. No.: 17/188,652

(22) Filed: Mar. 1, 2021

Related U.S. Application Data

(60) Provisional application No. 63/017,371, filed on Apr. 29, 2020, provisional application No. 62/983,275, filed on Feb. 28, 2020.

(51) Int. Cl.
*G06Q 40/00* (2023.01)
*G06Q 40/04* (2012.01)

(52) U.S. Cl.
CPC .................................. *G06Q 40/04* (2013.01)

(58) Field of Classification Search
CPC ...................................................... G06Q 40/04
See application file for complete search history.

(56) References Cited

U.S. PATENT DOCUMENTS

| 10,402,902 B1 * | 9/2019 | Isaacson | G06Q 40/04 |
| 2018/0158141 A1 * | 6/2018 | Facini | G06Q 30/08 |
| 2020/0167866 A1 * | 5/2020 | Schwall | G06Q 40/04 |

FOREIGN PATENT DOCUMENTS

WO   WO-2014205543 A1 * 12/2014 ............. G06Q 40/04

* cited by examiner

Primary Examiner — Rajesh Khattar
(74) Attorney, Agent, or Firm — Fish & Richardson P.C.

(57) ABSTRACT

Systems and techniques are described for implementing quote depletion protection via an exchange computer system. In some implementations, a financial instrument transaction order (e.g., a midpoint discretionary order for a financial instrument) with an instruction to apply quote depletion protection is received from a user device. Market conditions associated with the financial instrument transaction order (e.g., a National Best Bid ("NBB") or National Best Offer ("NBO")) are monitored. A quote depletion protection profile related to the financial instrument transaction order is accessed. An operation is then performed based on the market conditions and the quote depletion protection profile. The operation includes preventing execution of the order at a price between the NBB and NBO, or preventing execution of the order at a price between the NBB and NBO unless it can be executed at less than a threshold price differential relative to the NBB or NBO.

21 Claims, 12 Drawing Sheets

QDP Active Period = 2 milliseconds

NBBO: $10.00 x $10.01

*Order 1*: Buy 100 shares @ $10.00 Displayed

*Order 2*: Buy 200 shares @ $10.01 – MDO with QDP, Hidden, Offset = -$0.01

*Order 3*: Sell 1 share @ $10.00 IOC – Time = 12:00:00:000

*Order 4*: Sell 100 shares @ $10.00 Midpoint Pegged IOC – Time = 12:00:00:001

FIG. 3A

QDP Active Period = 2 milliseconds

NBBO: $10.00 x $10.01

*Order 1*: Buy 100 shares @ $10.00 Displayed

*Order 2*: Buy 200 shares @ $10.01 – MDO with QDP, Hidden, Offset = -$0.01

*Order 3*: Sell 200 shares @ $9.99 ISO IOC – Time = 12:00:00:000

FIG. 3B

QDP Active Period = 2 milliseconds

NBBO: $10.00 x $10.01

*Order 1*: Buy 100 shares @ $10.00 Displayed

*Order 2*: Buy 200 shares @ $10.01 – MDO with QDP, Hidden, Offset = -$0.01

*Order 3*: Sell 100 shares @ $10.00 IOC – Time = 12:00:00:000

*Order 4*: Sell 100 shares @ $10.00 Midpoint Pegged IOC – Time = 12:00:00:003

FIG. 3C

QDP Active Period = 2 milliseconds

NBBO: $10.00 x $10.01

*Order 1*: Buy 100 shares @ $10.00 Displayed

*Order 2*: Buy 200 shares @ $10.01 – MDO with QDP, Hidden, Offset = -$0.01

*Order 3*: Sell 200 shares @ $10.00 IOC – Time = 12:00:00:000

FIG. 3D

QDP Active Period = 2 milliseconds

NBBO: $10.00 x $10.01

*Order 1*: Buy 100 shares @ $10.00 Displayed

*Order 2*: Buy 200 shares @ $10.01 – MDO with QDP, Hidden, Offset = -$0.01

*Order 1*: Full Cancel – Time = 12:00:00:000

*Order 3*: Sell 200 shares @ $10.00 IOC – Time = 12:00:00:001

FIG. 3E

QDP Active Period = 2 milliseconds

NBBO: $10.00 x $10.01

*Order 1*: Sell 100 shares @ $10.01 Displayed

*Order 2*: Buy 200 shares @ $10.01 – MDO with QDP, Hidden, Offset = -$0.01

*Order 1*: Full Cancel – Time = 12:00:00:000

*Order 3*: Sell 200 shares @ $10.00 IOC – Time = 12:00:00:001

FIG. 3F

QDP Active Period = 2 milliseconds

NBBO: $10.00 x $10.01

*Order 1*: Buy 100 shares @ $9.99 Displayed

*Order 2*: Buy 200 shares @ $10.01 – MDO with QDP, Hidden, Offset = -$0.01

*Order 1*: Full Cancel – Time = 12:00:00:000

*Order 3*: Sell 200 shares @ $10.00 IOC – Time = 12:00:00:001

FIG. 3G

QDP Active Period = 2 milliseconds

NBBO: $10.00 x $10.01

*Order 1*: Buy 100 shares @ $9.99 Displayed

*Order 2*: Buy 100 shares @ $10.00 Displayed

*Order 3*: Buy 100 shares @ $10.01 – MDO with QDP, Hidden, Offset = -$0.02

*Order 4*: Sell 100 shares @ $10.00 IOC – Time = 12:00:00:000

*Order 5*: Sell 100 shares @ $9.99 ISO IOC – Time = 12:00:00:001

*Order 6*: Sell 100 shares @ $10.00 ISO IOC – Time = 12:00:00:002

FIG. 3H

QDP Active Period = 2 milliseconds

NBBO: $10.00 x $10.01

Order 1: Buy 100 shares @ $10.00 Displayed

Order 2: Sell 1 share @ $10.00 IOC – Time = 12:00:00:000

FIG. 3I

QDP Active Period = 2 milliseconds

NBBO: $10.00 x $10.10

*Order 1*: Buy 100 shares @ $10.00 Displayed

*Order 2*: Buy 200 shares @ $10.03 – MDO with QDP, Hidden, Offset = -$0.01

*Order 3*: Sell 300 shares @ $10.05 – MDO with QDP, Hidden, Offset = +$0.01

*Order 4*: Sell 1 share @ $10.00 IOC – Time = 12:00:00:000

*Order 5*: Sell 100 shares @ $10.01 IOC – Time = 12:00:00:001

*Order 6*: Buy 100 shares @ $10.05 IOC – Time = 12:00:00:0015

FIG. 3J

QUOTE DEPLETION PROTECTION

CROSS-REFERENCE TO RELATED APPLICATIONS

This application claims the benefit of U.S. Provisional Patent Application No. 62/983,275, filed Feb. 28, 2020, and U.S. Provisional Patent Application No. 63/017,371, filed Apr. 29, 2020, each of which is incorporated herein by reference in its entirety.

TECHNICAL FIELD

This application relates to technology for trading financial instruments in electronic exchanges, as well as hybrid exchanges that combine electronic and open-outcry trading mechanisms.

BACKGROUND

High volumes of financial instruments such as derivatives, stocks, and bonds are continuously traded at electronic exchanges, which enable trades to occur in real time through the algorithmic processing of orders and associated market information. Generally, a trade may be executed when the price associated with a bid to purchase a financial instrument matches the price associated with an offer to sell the same instrument. Market participants typically price their bids and offers based on market conditions, which are subject to rapid change, and electronic exchanges often match bids and offers based on price-time priority, and the principle of first-in, first-out (FIFO).

SUMMARY

Many market participants avail themselves of the opportunity to specify the conditions in which they are willing to trade, through the use of order types made available by electronic exchanges. For example, a midpoint discretionary order (MDO) is a complex order type that can be used to indicate liquidity at the National Best Bid (NBB) or National Best Offer (NBO) (depending on whether the MDO is for the purchase or sale of a financial instrument), with discretion to execute at prices to and including the midpoint of the national best bid or offer (NBBO) (i.e., a range based on the NBB and NBO). Although often useful, the discretion associated with an MDO can become harmful to the trader if applicable market conditions indicate that it may be less desirable to execute within the order's discretionary range.

Some market participants have sought advantage over others through the use of sophisticated computer algorithms that can analyze market conditions and react to changes by placing large volumes of orders at relatively high speeds—typically, within fractions of a second of a detected change. Such market participants also often invest large sums in cutting-edge computer systems that can process and send orders at the highest possible speed. Similarly, some market participants invest significant resources on the fastest network connections and place their computers as close to the exchange as possible to reduce communications latency between their computers and the exchange.

Not all traders have access to these resources, which command massive capital to obtain; accordingly, where there is an objective not to reward the traders market participants with the fastest algorithms, computers, and network connections, there is a need for technology that reduces the advantages possessed by some traders over others. The discretion associated with an MDO can, for example, become harmful to the trader who placed the order algorithmic traders drive rapid change in market conditions, such that execution at prices to and including the midpoint of the NBBO is no longer profitable.

The disclosure that follows relates to technology enabling market participants to submit financial instrument transaction orders to an exchange computer system, with an instruction to apply quote depletion protection. The quote depletion protection provided by the disclosed technology can enhance the usefulness of certain order types to market participants, by providing protection against volatile market conditions. For example, a user can enter a financial instrument transaction order with an instruction such that an exchange computer system disables execution of the order for a limited time period.

A market participant may, for example, enter an MDO with an instruction such that the exchange computer system monitors the NBB or NBO and prevents execution of the order at a price between the NBB and NBO. Additionally, or alternatively, the exchange computer system may prevent execution of the order at a price between the NBB and NBO, unless it can be executed at less than a threshold price differential relative to the NBB or NBO.

As described herein, an MDO is a transaction order for a financial instrument that is executable at the NBB for a buy order, or at the NBO for a sell order. An MDO may also have discretion to execute at prices to and including the midpoint of the NBBO.

As described herein, "quote depletion protection" (QDP) refers to an instruction that disables discretion to execute an order for a limited time period in certain circumstances. For instance, to prevent executions at prices more aggressive than a ranked price when execution of an exchange's quote indicates that the market may be moving in a direction against the order. For example, in the case of an MDO involving a buy order, QDP may be used where the best bid displayed in an exchange order book for a financial instrument is executed or cancelled below one round lot. As another example, in the case of an MDO involving a sell order, QDP may be used where the best offer displayed in an exchange order book for a financial instrument is executed or cancelled below one round lot.

The QDP techniques described throughout this disclosure can be applied regardless of the side of the order (e.g., buy side, sell side) and with various order types. For instance, QDP techniques can be applied to orders involving both "round lots" and "odd lots". In this context, a "round lot" is a standard number of financial instruments to be traded on an exchange. For example, if the financial instrument is a stock, one round lot refers to a number of shares (e.g., 1 share, 100 shares) that can be evenly divided. As another example, if the financial instrument is a bond, a round lot can represent a fiat currency value (e.g., $100,000 worth of the bond). An "odd lot" is an order amount for a financial instrument that is less than the normal amount of trading for that particular financial instrument. For example, if the financial instrument is a stock and one round lot of the stock refers to 100 shares, an odd lot can be considered anything than the number of shares of the round lot, such as 10 shares, 25 shares, 50 shares, or 90 shares.

The QDP techniques can also be applied to different order entry types, such as "post-only" and "trade-on" entry types. In this context, a "post-only" entry refers to an order type that increases a market participant's ability to control their provision, or taking, of market liquidity. A post-only order will, for example, only be posted to the order book if it would not be posted at the same price as another already existing order. A "trade-on" entry refers to entries without a post-only option, which can be executed faster and earlier in time based on the market price and the limit price of an order.

In one aspect, a method for quote depletion protection implemented via an exchange computer system includes receiving, from a user device, a financial instrument transaction order with an instruction to apply quote depletion protection. The financial instrument transaction order may be a midpoint discretionary order for a particular financial instrument. The method may include monitoring, by one or more processors, market conditions associated with the order, which may include the NBB or NBO. The method may also include accessing a quote depletion protection profile related to the order, and based on the market conditions and the profile, performing one or more actions. The one or more actions may include preventing execution of the order at a price between the NBB and NBO, or preventing execution of the order at a price between the NBB and NBO unless it can be executed at less than a threshold price differential relative to the NBB or NBO.

In some implementations, the market conditions can include a number of executions or cancellations of orders for the financial instrument. The market conditions may also include whether the NBB or NBO are executed below one round lot, or cancelled below one round lot.

In some implementations, the quote depletion protection profile is user configurable. The method may also include delaying execution of the order for a period of time based on the market conditions and the profile. The period of time and the price differential may both be configurable. Alternatively, the threshold price differential can be defined by the quote depletion protection profile.

Certain implementations may provide various advantages. For example, the disclosed technology can be used to restrict the discretion associated with some order types under certain conditions, so as to protect market participants against volatile market conditions. The disclosed technology can also be used to expand the range of discretion available to a market participant, relative to other publicly available financial instrument transaction order types on other exchange platforms.

The details of one or more embodiments of the subject matter described in this specification are set forth in the accompanying drawings and the description below. Other potential aspects, features, and advantages will be apparent from the description, the drawings, and the claims.

BRIEF DESCRIPTION OF THE DRAWINGS

FIGS. 3A-3J are diagrams of exemplary scenarios in which financial instrument transaction orders with instructions to apply quote depletion protection are processed by an exchange computer system.

DETAILED DESCRIPTION

Figure 1:
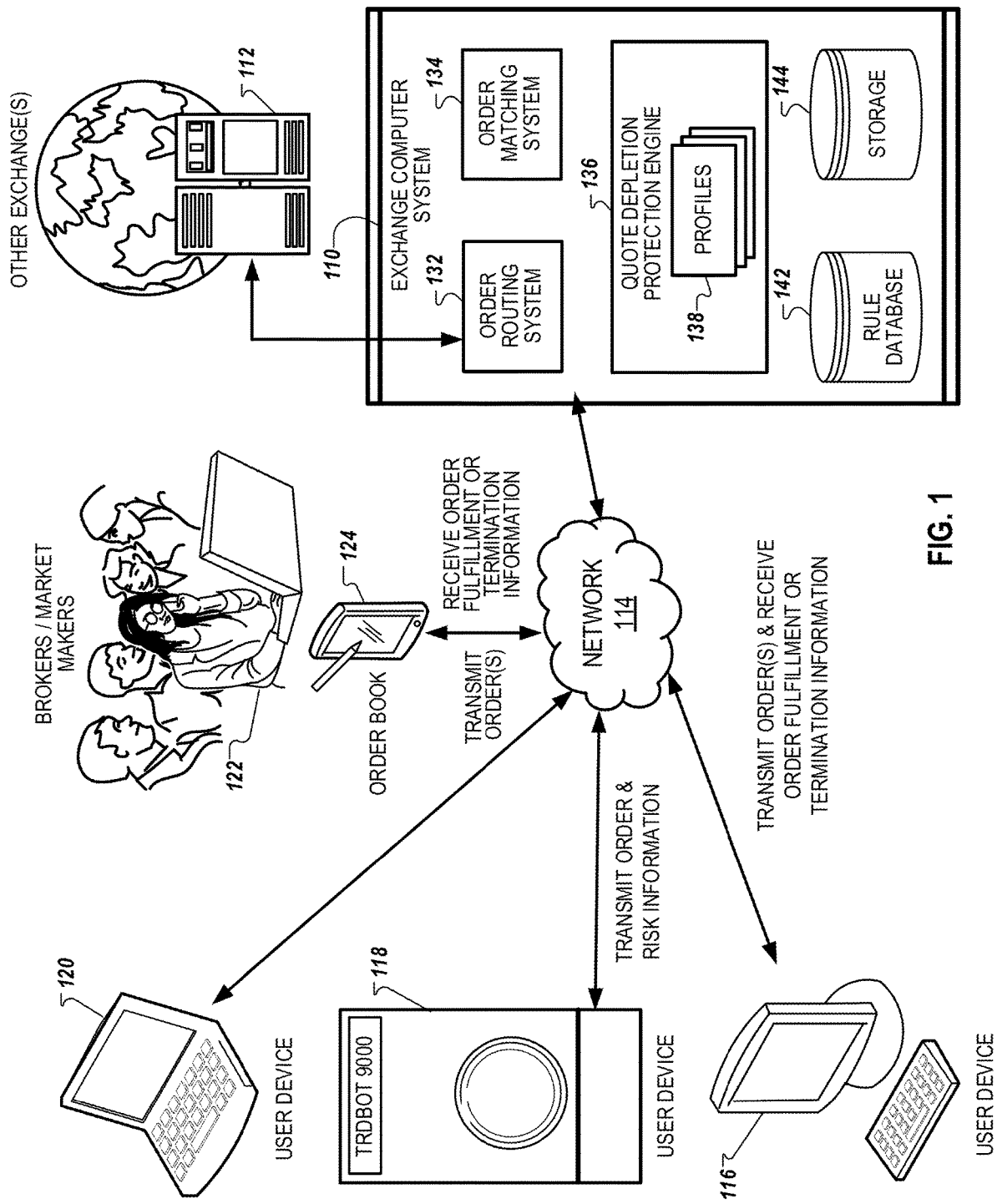
FIG. 1 is a diagram of an example of an exchange computer system and associated networks, devices, and users.

FIG. 1 is a diagram of an exchange computer system and the associated networks, devices, and users that make up an exemplary trading environment in which that system operates. Generally, the term "user" may refer to any entity that interacts with the exchange computer system and/or associated networks and devices. Users may include, for example, market makers and other market professionals, brokers, institutional traders, individual traders, and automated trading systems. The diagram includes an exchange computer system 110, other exchanges 112, a network 114, user devices 116, 118, 120, market makers/brokers 122, and electronic order book 124.

The exchange computer system 110 may be implemented in a fully electronic manner, or in a hybrid manner that combines electronic trading with aspects of traditional open-outcry systems. The exchange computer system 110 may receive orders for trading financial instruments locally on the floor and from remote electronic devices. The financial instruments may include securities such as stocks, options, futures, or other derivatives associated with an underlying asset.

Network 114 connects the various components within the trading environment, and is configured to facilitate communications between those components. Network 114 may, for example, be configured to enable the exchange of electronic communications that include order and order fulfillment information between connected devices, such as an electronic order book 124 and the exchange computer system 110.

Network 114 may include one or more networks or subnetworks, each of which may include a wired or wireless data pathway. Network 114 may, for example, include one or more of the Internet, Wide Area Networks (WANs), Local Area Networks (LANs), or other packet-switched or circuit-switched data networks that are capable of carrying electronic communications (e.g., data or voice communications).

To protect communications between the various systems, devices, and components connected to network 114, network 114 may implement security protocols and measures such that data identifying order or bid information, or parties placing orders or quotes, may be securely transmitted. Network 114 may, for example, include virtual private networks (VPNs) or other networks that enable secure connections to be established with exchange computer system 110.

User devices 116, 118, and 120 may include portable or stationary electronic devices, such as smartphones, laptops, desktops, and servers that include user interfaces to display information and receive user input, and that are configured to communicate over a computer network. User devices 116, 118, and 120 may communicate with the exchange computer system 110 over network 114 using a proprietary protocol, or a message-based protocol such as financial information exchange (FIX), implemented over TCP/IP.

User devices 116, 118, and 120 may transmit user input such as order information or risk information to the exchange computer system 110, and may also receive data from the exchange computer system 110 indicating that an order has been filled or canceled.

Users such as brokers/market makers 122 may also place orders and receive information about order fulfillment or termination through electronic order book 124, which may include a record of outstanding public customer limit orders that can be matched against future incoming orders.

The exchange computer system 110 includes an order routing system (ORS) 132, an order matching system (OMS) 134, a quote depletion protection (QDP) engine 136, a database of trading rules and algorithms 142, and storage 144. In some implementations, the exchange computer system 110 is a distributed computer system.

The order routing system (ORS) 132 determines whether a received order or quote is to be executed at the exchange computer system 110, or should instead be redirected to another exchange 112, and includes processing systems that enable the management of high data volumes. The ORS 132 may, for example, receive order or quote information for the purchase or sale of financial instruments from one or more user devices 116, 118, 120, and 124. In some implementations, the ORS 132 may also be connected to or include a touch-screen order routing and execution system accessible by brokers on the exchange floor, such as a public automated routing (PAR) system.

Upon receiving an order or quote, the ORS 132 determines if the destination specified in the received order or quote is the exchange computer system 110. If the exchange computer system 110 is not the destination, the ORS 132 forwards the order or quote to another exchange 112, which may be either the destination exchange, or an exchange en route to the destination exchange.

If the ORS 132 determines that the exchange computer system 110 is the destination of the received order or quote, the ORS 132 may forward the received order or quote to the order matching system 134.

The order matching system (OMS) 134 includes processing systems that analyze and manipulate orders according to matching rules stored in the database 142. The OMS 134 may also include an electronic book (EBOOK) of orders and quotes with which incoming orders to buy or sell are matched, according to the matching rules. The EBOOK may also be implemented in a separate database such as storage 144, which may include multiple mass storage memory devices for the storage of order and quote information. When the OMS 134 determines that a match exists for an order (for example, when a bid matches an offer for sale), the order matching system 134 may mark the matched order or quote with a broker-specific identifier so that the broker sending the order or quote information can be identified.

The quote depletion protection (QDP) engine 136 interacts with the OMS 134 and facilitates processes for the trading of financial instruments. The QDP engine 136 may be implemented using a combination of software and hardware. The QDP engine 136 may, for example, be implemented as one or more hardware processors configured to execute one or more algorithms, as described in further detail below.

The QDP engine 136 may process one or more instructions received with a financial instrument transaction order. For example, the financial instrument transaction order can include an offset instruction that specifies an offset to the NBBO that is pegged to a price above or below the NBB or NBO to which the order is pegged (i.e., pegged to the NBB for buy orders, pegged to the NBO for sell orders).

The offset allows a user to obtain the best bid without revealing a limit price of the order (i.e., the highest price a user is willing to pay for a financial instrument, or the lowest price a user is willing to sell a financial instrument). The offset can be equal to or greater than one minimum price variation (MPV) (i.e., the smallest increment of a security price, such as $0.01) above or below the applicable NBB or NBO.

As an example, a user may be interested in buying 1,000 shares of a stock, but may not be willing to pay more than $20.00 per share. If the NBB is currently $19.80 per share, while the NBO is $20.20 per share, an instruction with an offset of $0.20 can be used as a peg order with a limit price of $20.00. In some instances, when the order is placed, the order book does not display the limit price of $20.00 and instead joins the NBB of $19.80. When the NBO price reaches the limit price of $20.00, a buy order is executed.

The QDP engine 136 may also facilitate quote depletion protection. For example, the QDP engine 136 may receive an MDO that includes an instruction to apply quote depletion protection in certain circumstances. In particular, the QDP instruction can restrict the exercise of discretion on the MDO in circumstances where applicable market conditions indicate that it may be less desirable to execute within the order's discretionary range. This is accomplished by accessing a QDP profile from among a set of QDP profiles 138 that correspond to the QDP instruction.

The QDP profiles 138 can specify a QDP active period during which the restrictions specified by the QDP instruction remain in effect. For example, the QDP active period would be enabled or refreshed for buy MDOs if the best bid displayed on the order book is either executed (i) below one round lot, or (ii) at the national best bid and cancelled below one round lot. As another example, the QDP active period would be enabled or refreshed for sell MDOs if the best offer displayed on the order book is either executed (i) below one round lot, or (ii) at the national best offer and cancelled below one round lot. During the QDP active period, an MDO entered with a QDP instruction would not exercise discretion for a limited time period, and instead would only be executable at its ranked price.

Once activated, the QDP active period remains in place to prevent the execution of MDOs within their discretionary ranges for a specified period of time. For example, when a QDP active period is initially enabled, or refreshed by a subsequent execution or cancellation of the best bid (offer) then displayed on the order book, it would remain enabled for a configurable period of, for instance, up to five milliseconds. The duration of the QDP active period could be determined and published in a circular distributed to members. In some implementations, the duration of the QDP active period may be adjusted to better reflect needs of exchange members that use the QDP instruction. For example, a configurable QDP active period may be implemented with the goal of facilitating protection provided by the QDP instruction, while at the same time, not unduly limiting the ability of orders entered with this instruction to exercise discretion and execute at more aggressive prices within the order's discretionary range.

As discussed herein, the QDP instruction is designed to protect resting MDOs based on the execution or cancellation of the best bids and offers displayed on the order book. In some instances, users may prefer to utilize the QDP instruction along with an offset instruction that results in the MDO being posted at a price that is inferior to the applicable NBB or NBO (with discretion to the midpoint).

In some implementations, given the less aggressive offset, and the fact that these orders are seeking additional protection, there may be less incentive for users to include a displayed instruction (e.g., an order with its limit price being displayed on the order book). As a result, in such implementations, unless the user chooses otherwise, an MDO to buy or sell entered with a QDP instruction would default to a non-displayed instruction and would include an offset amount equal to one MPV below or above the NBB or the NBO, respectively. Such implementations permit users to change these default instructions based on their specific needs.

Storage 144 and database 142 store and handle data in a manner that satisfies the privacy and security requirements of the exchange computer system 110 and its users, and may store one or more of telemetry data, user profiles, user history, and rules and algorithms for matching quotes, bids, and orders.

Upon completion of a trade (through the floor in open outcry as entered into the PAR system, or through automatic execution through the OMS 134 and auction engine 136), the fill information is passed through the OMS 134 and the ORS 132 to one or more user devices 116, 118, 120, and 124, and to the auction engine 136. The auction engine 136 matches the buy side and sell side of a trade, and forwards the matched trade to a third party organization that verifies the proper clearance of the trade, such as the Options Clearing Corporation (OCC) where the securities may be options, or Depository Trust Company (DTC) where the securities may be equities. The OMS 134 also formats the quote and sale update information and sends that information through an internal distribution system that refreshes display screens on the floor, in addition to submitting the information to a quote and trade dissemination service such as, in the case of options, the Options Price Reporting Authority (OPRA). In the case of Equities, the information would be submitted to the Securities Information Processor (SIP).

Figure 2:
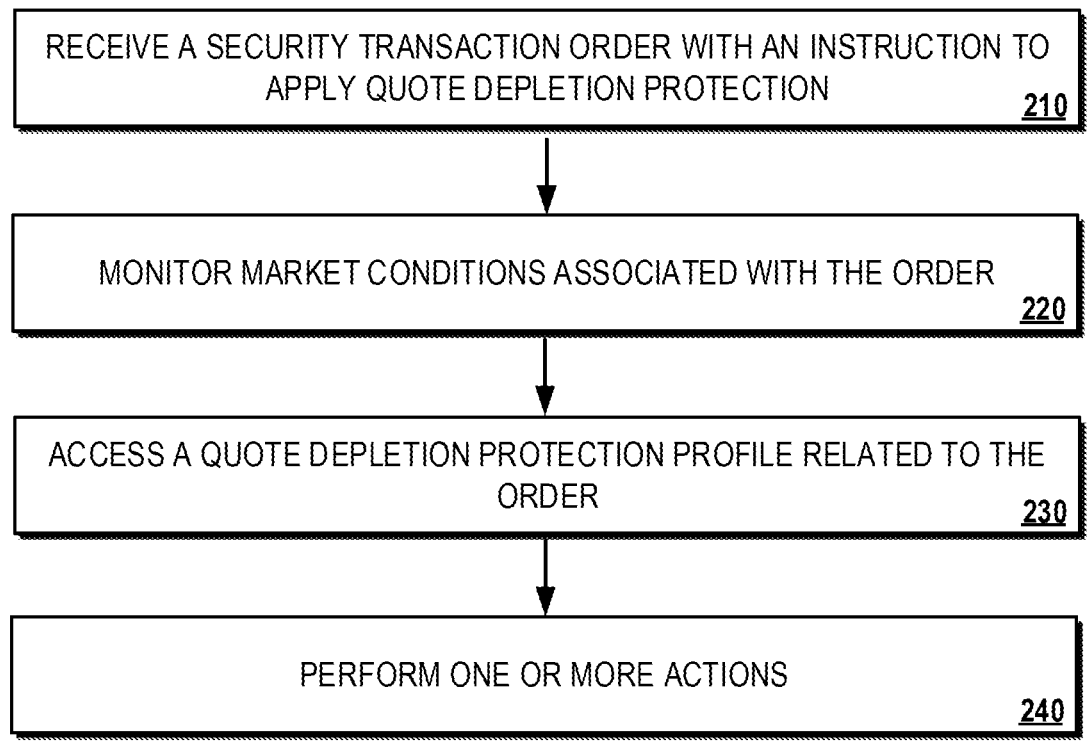
FIG. 2 is a flowchart of an example process for implementing quote depletion protection.

FIG. 2 is a flowchart of an exemplary process 200 for implementing quote depletion protection. Briefly, the process 200 includes the steps of receiving a financial instrument transaction order with an instruction to apply quote depletion protection (210), monitoring market conditions associated with the order (220), accessing a quote depletion protection profile related to the order (230), and performing one or more actions (240).

In more detail, the process 200 includes the step of receiving a financial instrument transaction order with an instruction to apply quote depletion protection (210). For example, the exchange computer system 110 may receive a financial instrument transaction order from a user device associated with one of the brokers/market makers 122. The financial instrument transaction order can be an MDO for a financial instrument and can include a QDP instruction. As discussed above, the QDP instruction can restrict the exercise of discretion on the MDO in circumstances where applicable market conditions indicate that it may be less desirable to execute within the order's discretionary range.

The process 200 includes the step of monitoring market conditions associated with the financial instrument transaction order (220). For example, the exchange computer system 110 can monitor market conditions associated with the financial instrument transaction order. In some implementations, the exchange computer system's QDP engine 136 monitors the market conditions associated with the order. The market conditions can include the NBB or the NBO associated with the order, depending on order type (e.g., buy order, sell order). In some implementations, the market conditions include whether the NBB or NBO are either executed below one round lot or cancelled below one round lot.

The process 200 includes the step of accessing a quote depletion protection profile related to the order (230). For example, the QDP engine 136 can access a QDP profile among the QDP profiles 138 that is related to the order. In some implementations, the QDP profiles 138 can be configurable based on settings specified by a user before placing the order, and/or while placing the order. The QDP profiles 138 can specify a QDP active period and a threshold price differential between a discretionary price of the order and the corresponding NBB or NBO, among other types of information that can be used to restrict the exercise of discretion on MDOs entered with QDP instructions.

The process 200 includes the step of performing one or more actions (240). For example, the QDP engine 138 can perform one or more of preventing execution of the order at a price between the NBB and NBO, or preventing execution of the order a price between the NBB and NBO unless it can be executed at less than a threshold price differential relative to the NBB or NBO.

FIGS. 3A-3J are diagrams of exemplary scenarios in which financial instrument transaction orders with instructions to apply quote depletion protection are processed by an exchange computer system. The exemplary orders referenced in FIGS. 3A-3J can, for example, be received by the exchange computer system 110 and processed by the QDP engine 136 to determine whether to exercise discretion or prevent the execution of MDOs within their discretionary ranges, as discussed throughout this specification.

In the example depicted in FIG. 3A, Order 2 is an MDO to buy and is ranked at $9.99 based on its −$0.01 offset applied to the $10.00 NBO. Order 2 is also non-displayed (i.e., the order does is not displayed to in the transaction order book), and has a discretion to the midpoint price of $10.005, which is based on the midpoint of the NBBO range between $10.00 and $10.01. When Order 3 is entered, it will trade a single share with Order 1 at $10.00 since Order 3's sell order of 1 share at $10.00 matches the $10.00 price specified by Order 1's buy order for 100 shares. This trade triggers a QDP active period for Order 2 because of the execution of the best bid for the trade (which is based on Order 3's sell price of $10.00) is below the NBO price of Order 2. The triggering of the QDP active period restricts the ability for Order 2 to exercise discretion for two milliseconds, and thereby prevents the execution of Order 4 within Order 2's discretionary range. As a result, Order 4 would be cancelled without an execution.

The example depicted in FIG. 3B is the same as the example depicted in FIG. 3A, except that Order 3 is an Intermarket Sweep Order (ISO) with an Immediate-Or-Cancel (IOC) feature. An ISO order is a type of order for a financial instrument that is submitted to multiple electronic exchanges at once and used to purchase or sell as many shares as possible from the submitted orders. An IOC feature requires all or parts of an order to be executed immediately, and any unfilled parts of the order are cancelled. Compared to the example depicted in FIG. 3A, Order 3 is for 200 shares that is priced equal to the non-displayed ranked price of Order 2, and there is no Order 4. In this example, Order 3 would trade 100 shares with Order 1 at $10.00. This triggers a QDP active period for similar reasons as discussed in reference to FIG. 3A. However, the triggering of a QDP active period would not prevent the execution of an MDO at its ranked price. As a result, Order 3 would trade its remaining 100 shares with Order 2 at $9.99.

The example depicted in FIG. 3C is the same as the example depicted in FIG. 3A, except that Order 3 is for 100 shares, and Order 4 is entered after the QDP active period has concluded. In this example, Order 3 would trade 100 shares with Order 1 at $10.00, triggering a QDP active period. The QDP active period triggered by the execution of the EDGX Best Bid below one round lot would be disabled after two milliseconds, and Order 4 would execute 100 shares against Order 2 at $10.005.

In the example depicted in FIG. 3D, Order 2 is an MDO to buy and is ranked at $9.99 non-displayed with discretion to the midpoint price of $10.005. When Order 3 is entered, it would first trade 100 shares with Order 1 at $10.00. A QDP active period is then immediately enabled for Order 2 because of the execution of the best bid below one round lot. This restricts the ability for Order 2 to exercise discretion for two milliseconds and prevents the execution of the remaining 100 shares of Order 3 within Order 2's discretionary range. As a result, the remaining quantity of Order 3 would be cancelled.

The example depicted in FIG. 3E is the same as the example depicted in FIG. 3D, except that Order 1 is cancelled one millisecond before the receipt of Order 3. In this example, because Order 1 (which establishes the best bid) is priced at the NBB, a QDP active period would be immediately enabled following its cancellation. This restricts the ability for Order 2 to exercise discretion for two milliseconds and prevents the execution of Order 3 within Order 2's discretionary range. As a result, Order 3 would be cancelled without an execution.

The example depicted in FIG. 3F is the same as the example depicted in FIG. 3E, except that Order 1 is an offer priced at the NBO rather than a bid at the NBB. In this example, a QDP active period for an MDO would only be enabled by an execution or cancellation of an order on the same side of the market. Thus, Order 2, which is an MDO to buy, would not be impacted by the cancellation of Order 1, which is an order to sell. As a result, Order 3 would execute 200 shares with Order 2 at $10.00.

The example depicted in FIG. 3G is the same as the example depicted in FIG. 3E, except that Order 1 is entered at a price that is inferior to the NBB. In this example, because Order 1 is not at the NBB, its cancellation does not trigger a QDP active period. As a result, Order 3 would trade 200 shares with Order 2 at $10.00.

In the example depicted in FIG. 3H, Order 3 is an MDO to buy and is ranked at $9.98 non-displayed with discretion to the midpoint price of $10.005. When Order 4 is entered it would trade 100 shares with Order 2 at $10.00. A QDP active period is then immediately enabled for Order 3 because of the execution of the best bid below one round lot. This restricts the ability for Order 3 to exercise discretion for two milliseconds. When Order 5 is entered it would trade 100 shares with Order 1, which is now the best bid, at $9.99, refreshing the QDP active period and extending it until 12:00:00:003. When Order 6 is entered it would be cancelled without an execution as Order 3 would still be subject to the extended QDP active period.

In the example depicted in FIG. 3I, which involves QDP enabled on both sides, Order 1 is an order to buy 100 shares at $10.00. Order 2 is an order to sell 1 share at $10.00 with an IOC feature. When Order 2 is entered it would trade 1 share with Order 1 at $10.00. Because Order 1 is executed below 1 round lot, QDP is enabled for 2 milliseconds for both buy and sell MDO with QDP orders.

In the example depicted in FIG. 3J, which involves QDP enabled on both sides, Order 1 is an order to buy 100 shares at $10.00. Order 2 is an MDO to buy 200 shares non-displayed with discretion to the midpoint price. Order 3 is an MDO to sell 300 shares non-displayed with discretion to the midpoint price. When Order 1 is executed below 1 round lot by Order 4, QDP is enabled for 2 milliseconds for both buy and sell MDO with QDP orders. Order 5 does not trade with Order 2 since QDP is enabled on the buy side, and Order 6 does not trade with Order 3 since QDP is enabled on the sell side.

Implementations have been described, but other implementations are within the scope of the following claims.

What is claimed is:

1. A method implemented via an exchange computer system for providing quote depletion protection, the method comprising:

receiving, from a first user device and through an order routing system of the exchange computer system, a first order for a first asset without an instruction to apply quote depletion protection;

in response to receiving the first order, operating the exchange computer system in a first operation mode in which quote depletion protection is not applied;

receiving, from a second user device and through the order routing system of the exchange computer system, a second order for an asset with an instruction to apply quote depletion protection, wherein the second order is a midpoint discretionary order comprising a discretionary range of prices for the second order;

in response to receiving the second order, operating the exchange computer system in a second operation mode in which quote depletion protection is applied;

in the second operation mode of the exchange computer system:

activating, by the exchange computer system, a quote depletion protection engine in response to initiating the second operation mode, the quote depletion protection engine comprising a processor connected to a computer network and configured to control storage of quote depletion protection profiles;

monitoring, by one or more processors of an order matching system of the exchange computer system, data associated with the asset, wherein the data associated with the asset includes prices indicating a national best bid or national best offer for the asset;

processing the second order with the instruction through the quote depletion protection engine, wherein the quote depletion protection engine is configured to perform operations comprising:

identifying, based on the monitored data associated with the asset provided by the order matching system of the exchange computer system, one or more open orders for the asset on an order book of the exchange computer system, each of the one or more open orders for the asset comprising a number of shares of the asset to be (1) executed below one round lot, or (2) canceled below one round lot, at the national best bid or national best offer;

retrieving, from the quote depletion protection engine, at least one quote depletion protection profile corresponding to the second order, wherein the at least one quote depletion protection profile indicates a first time period for quote depletion protection and a threshold price differential for applying quote depletion protection, the threshold price differential comprising a difference between a price of the second order and a value of the national best bid or national best offer;

determining, based on the monitored data associated with the asset, that the price of the second order is between the national best bid and national best offer;

identifying, based on the monitored data associated with the asset, the one or more open orders for the asset on the order book of the exchange computer system at the price between the national best bid and the national best offer;

responsive to determining that the price of the second order is between the national best bid and national best offer and responsive to identifying the one or more open orders for the asset, activating, by the quote depletion protection engine, the first time period for quote depletion protection;

determining that the second order cannot be executed at less than the threshold price differential for applying quote depletion protection; and responsive to determining that the second order cannot be executed at less than the threshold price differential for applying quote depletion protection, preventing, by the quote depletion protection engine, execution of the second order through the order matching system at the price between the national best bid and national best offer during the first time period for quote depletion protection.

2. The method of claim 1, wherein the data associated with the asset include a number of executions or cancellations of orders for the asset on the order book of the exchange computer system.

3. The method of claim 1, wherein:
the second order comprises a buy order for the asset on the order book of the exchange computer system; and
the monitored data associated with the asset include whether the national best bid is (1) executed below one round lot or (2) cancelled below one round lot.

4. The method of claim 1, wherein:
the second order comprises a sell order for the asset on the order book of the exchange computer system; and
the monitored data associated with the asset include whether the national best offer is (1) executed below one round lot or (2) cancelled below one round lot.

5. The method of claim 1, wherein the first time period of the at least one quote depletion protection profile is configurable by the quote depletion protection engine, based on one or more settings provided by the second user device.

6. The method of claim 1, further comprising, based on the monitored data associated with the asset and the at least one quote depletion protection profile, the quote depletion protection engine delaying execution of the second order through the order matching system of the exchange computer system for a period of time.

7. The method of claim 6, wherein the period of time is changed from the first time period to a second time period by the quote depletion protection engine in response to processing an instruction associated with the second order received by the order routing system.

8. The method of claim 1, wherein the threshold price differential of the at least one quote depletion protection profile is configurable, by the quote depletion protection engine, based on one or more settings provided by the second user device.

9. The method of claim 8, wherein the threshold price differential is defined by the at least one quote depletion protection profile.

10. An exchange computer system comprising:
one or more processors and one or more storage devices storing instructions that are operable, when executed by the one or more processors, to cause the one or more processors to perform operations comprising:

receiving, from a first user device and through an order routing system of the exchange computer system, a first order for a first asset without an instruction to apply quote depletion protection;

in response to receiving the first order, operating the exchange computer system in a first operation mode in which quote depletion protection is not applied;

receiving, from a second user device and through the order routing system of the exchange computer system, a second order for an asset with an instruction to apply quote depletion protection, wherein the second order is a midpoint discretionary order comprising a discretionary range of prices for the second order;

in response to receiving the second order, operating the exchange computer system in a second operation mode in which quote depletion protection is applied;

in the second operation mode of the exchange computer system:

activating, by the exchange computer system, a quote depletion protection engine in response to initiating the second operation mode, the quote depletion protection engine comprising a processor connected to a computer network and configured to control storage of quote depletion protection profiles;

monitoring, by one or more processors of an order matching system of the exchange computer system, data associated with the asset, wherein the data associated with the asset includes prices indicating a national best bid or national best offer for the asset;

processing the second order with the instruction through the quote depletion protection engine, wherein the quote depletion protection engine is configured to perform operations comprising:

identifying, based on the monitored data associated with the asset provided by the order matching system of the exchange computer system, one or more open orders for the asset on an order book of the exchange computer system, each of the one or more open orders for the asset comprising a number of shares of the asset to be (1) executed below one round lot, or (2) canceled below one round lot, at the national best bid or national best offer;

retrieving, from the quote depletion protection engine, at least one quote depletion protection profile corresponding to the second order, wherein the at least one quote depletion protection profile indicates a first time period for quote depletion protection and a threshold price differential for applying quote depletion protection, the threshold price differential comprising a difference between a price of the second order and a value of the national best bid or national best offer;

determining, based on the monitored data associated with the asset, that the price of the second order is between the national best bid and national best offer;

identifying, based on the monitored data associated with the asset, the one or more open orders for the asset on the order book of the exchange computer system at the price between the national best bid and the national best offer;

responsive to determining that the price of the second order is between the national best bid and national best offer and responsive to identifying the one or more open orders for the asset, activating, by the quote depletion protection engine, the first time period for quote depletion protection;

determining that the second order cannot be executed at less than the threshold price differential for applying quote depletion protection; and responsive to determining that the second order cannot be executed at less than the threshold price differential for applying quote depletion protection, preventing, by the quote depletion protection engine, execution of the second order through the order matching system at the price between the national best bid and national best offer during the first time period for quote depletion protection.

11. The exchange computer system of claim 10, wherein the data associated with the asset include a number of executions or cancellations of orders for the asset.

12. The exchange computer system of claim 10, wherein:
the second order comprises a buy order for the asset on the order book of the exchange computer system; and
the monitored data associated with the asset include whether the national best bid is (1) executed below one round lot or (2) cancelled below one round lot.

13. The exchange computer system of claim 10, wherein:
the second order comprises a sell order for the asset on the order book of the exchange computer system; and
the monitored data associated with the asset include whether the national best offer is (1) executed below one round lot or (2) cancelled below one round lot.

14. The exchange computer system of claim 10, wherein the operations further comprise the quote depletion protection engine delaying the execution of the second order through the order matching system of the exchange computer system for a period of time based on the monitored data associated with the asset and the at least one quote depletion protection profile.

15. The exchange computer system of claim 14, wherein the period of time is changed from the first time period to a second time period by the quote depletion protection engine, in response to processing an instruction associated with the second order received by the order routing system.

16. The exchange computer system of claim 10, wherein the threshold price differential of the at least one quote depletion protection profile is configurable, by the quote depletion protection engine, based on one or more settings provided by the second user device.

17. A non-transitory computer-readable storage medium comprising instructions, which, when executed by one or more computer processors in an exchange computer system for providing quote depletion protection, cause the one or more computer processors to perform operations comprising:
receiving, from a first user device and through an order routing system of the exchange computer system, a first order for a first asset without an instruction to apply quote depletion protection;
in response to receiving the first order, operating the exchange computer system in a first operation mode in which quote depletion protection is not applied;
receiving, from a second user device and through the order routing system of the exchange computer system, a second order for an asset with an instruction to apply quote depletion protection, wherein the second order is a midpoint discretionary order comprising a discretionary range of prices for the second order;
in response to receiving the second order, operating the exchange computer system in a second operation mode in which quote depletion protection is applied;
in the second operation mode of the exchange computer system:
activating, by the exchange computer system, a quote depletion protection engine in response to initiating the second operation mode, the quote depletion protection engine comprising a processor connected to a computer network and configured to control storage of quote depletion protection profiles;
monitoring, by one or more processors of an order matching system of the exchange computer system, data associated with the asset, wherein the data associated with the asset includes prices indicating a national best bid or national best offer for the asset;
processing the second order with the instruction through the quote depletion protection engine, wherein the quote depletion protection engine is configured to perform operations comprising:
identifying, based on the monitored data associated with the asset provided by the order matching system of the exchange computer system, one or more open orders for the asset on an order book of the exchange computer system, each of the one or more open orders for the asset comprising a number of shares of the asset to be (1) executed below one round lot, or (2) canceled below one round lot, at the national best bid or national best offer;
retrieving, from the quote depletion protection engine, at least one quote depletion protection profile corresponding to the second order, wherein the at least one quote depletion protection profile indicates a first time period for quote depletion protection and a threshold price differential for applying quote depletion protection, the threshold price differential comprising a difference between a price of the second order and the national best bid or national best offer;
determining, based on the monitored data associated with the asset, that the price of the second order is between the national best bid and national best offer;
identifying, based on the monitored data associated with the asset, the one or more open orders for the asset on the order book of the exchange computer system at the price between the national best bid and the national best offer;
responsive to determining that the price of the second order is between the national best bid and national best offer and responsive to identifying the one or more open orders for the asset, activating, by the quote depletion protection engine, the first time period for quote depletion protection;
determining that the second order cannot be executed at less than the threshold price differential for applying quote depletion protection; and
responsive to determining that the second order cannot be executed at less than the threshold price differential for applying quote depletion protection, preventing, by the quote depletion protection engine, execution of the second order through the order matching system at the price between the national best bid and national best offer during the first time period for quote depletion protection.

18. The non-transitory computer-readable storage medium of claim 17, wherein the monitored data associated with the asset include a number of executions or cancellations of orders for the asset on the order book of the exchange computer system.

19. The non-transitory computer-readable storage medium of claim 17, wherein:
the second order comprises a buy order for the asset on the order book of the exchange computer system; and
the monitored data associated with the asset include whether the national best bid is (1) executed below one round lot or (2) cancelled below one round lot.

20. The non-transitory computer-readable storage medium of claim 17, wherein:
the second order comprises a sell order for the asset on the order book of the exchange computer system; and
the monitored data associated with the asset include whether the national best offer is (1) executed below one round lot or (2) cancelled below one round lot.

21. The non-transitory computer-readable storage medium of claim 17, wherein the operations further comprise the quote depletion protection engine delaying the execution of the second order through the order matching system of the exchange computer system for a period of time based on the monitored data associated with the asset and the at least one quote depletion protection profile.

\* \* \* \* \*